United States Patent [19]

Kiely et al.

[11] Patent Number: 4,833,230
[45] Date of Patent: May 23, 1989

[54] POLYHYDROXYPOLYAMIDES AND PROCESS FOR MAKING SAME

[75] Inventors: Donald E. Kiely, Birmingham, Ala.; Tsu-Hsing Lin, Rockville, Md.

[73] Assignee: Research Corporation Technologies, Inc., Tucson, Ariz.

[21] Appl. No.: 209,663

[22] Filed: Jun. 21, 1988

[51] Int. Cl.$^4$ .............................................. C08G 4/00
[52] U.S. Cl. .................................... 528/230; 528/232; 528/243; 528/247; 528/266; 527/300; 527/312
[58] Field of Search ............... 528/230, 232, 243, 266, 528/247; 527/300, 312

[56] References Cited

U.S. PATENT DOCUMENTS 4,673,707 6/1987 Tsai et al. .......................... 525/54.2
4,711,879 12/1987 Baschang et al. .................... 514/42

*Primary Examiner*—John Kight
*Assistant Examiner*—S. A. Acquah
*Attorney, Agent, or Firm*—Scully, Scott, Murphy & Presser

[57] ABSTRACT

A new class of polyhydroxypolyamides is disclosed. The polyhydroxypolyamides, useful as fibers, plastics, coatings and adhesives, are characterized by the repeating structural unit

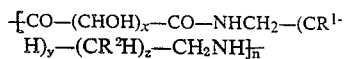

where $R^1$ and $R^2$ are the same or different and are hydrogen, $C_1$–$C_{50}$ alkyl, $C_2$–$C_{50}$ alkenyl or $C_7$–$C_{50}$ aralkyl; x is an integer of 1 to 6; y and z are the same or different and are 0 or an integer of 1 to about 30; and n is an integer of at least about 10.

A process for making these polyhydroxypolyamides is also taught. It includes the steps of reacting an aldaric compound, said compound selected from the group consisting of a diacid, an acid-lactone, a dilactone and mixtures thereof, with an alkanol to form an esterification product and forming the polyhydroxypolyamide by polymerizing the esterification product with a primary amine in a polar solvent.

26 Claims, No Drawings

POLYHYDROXYPOLYAMIDES AND PROCESS FOR MAKING SAME

BACKGROUND OF THE DISCLOSURE

1. Field of the Invention

The present invention is directed to a new class of polyhydroxypolyamides and a process for making same. More specifically, the present invention is directed to a class of polyhydroxypolyamides derived from aldose sugars and a process for forming said polymers.

2. Background of the Prior Art

Carbohydrate polymers are generally associated with that class of highly functionalized naturally occurring materials known as polysaccharides. Polysaccharides are an extremely important class of polymers due to their wide natural occurrence, their importance in health and nutrition and their wide use in agricultural, food, textile, pharmaceutical and paper industries. These polymers are formed from cyclic monosaccharide units which are linked by glycosidic (acetal) bonds. Naturally occurring monosaccharides, with their variance in carbon chain length and stereochemistry, also offer great potential as starting materials for the synthesis of carbohydrate polymers other than polysaccharides, specifically acyclic polymers with carbohydrates as part of the chain or as pendant groups.

The potential for producing synthetic polymers based on carbohydrates is a concept known in the art. Nylon-type polyamides, polymethacrylates and polyesters derived from hydroxyl protected carbohydrates have been prepared.

In the formation of synthetic polyamides from carbohydrates dialkyl aldarates have been condensed with amines to prepare polyamides. Ogata et al., *J. Polym. Sci: Polym. Chem. Ed.*, 14, 783 (1976) describes a condensation copolymerization between diethyl galactarate and hexamethylene diamine to form a nylon type polyamide. This polymerization occurs in a moderately polar to polar solvent such as dioxane, tetrahydrofuran, dimethylformamide, acetonitrile, ethylene glycol, dimethyl acetamide, methanol or methyl sulfoxide. In the solution polymerization reaction the polyamide product precipitates as a solid directly from the reaction mixture. A similar copolymerization, between diethyl galactarate and ethylene diamine, was more recently reported by Hoagland, P. D. Hoagland, *Carbohydrate Res.* 98, 203 (1981).

The Ogata et al. and Hoagland teachings represent an advance in the art. However, these disclosures are limited by the requirement that a pure diester, prepared from a pure diacid, be available as a starting reactant. Those skilled in the art are aware that such a process is not commercial. With the exception of galactose, none of the commercially available aldose sugar diacids form pure aldarates (diesters) in the well known Fischer esterification reaction. For this reason there has been no attempt to commercialize this process, albeit, the polymer product of this reaction has utility. As such there is similarly no teaching in the prior art directed to the copolymer product of this process, a polyhydroxypolyamide, other than the above-discussed galactarate copolyamides.

The above remarks establish the desirability of developing a new process which results in the formation of a polyhydroxypolyamide from a readily available low cost monosaccharide. That is, it is clear that if a process to produce polyhydroxypolyamides from low cost monosaccharides without the almost impossible task of having to prepare and purify diester derivatives thereof could be found, a whole new and useful class of polymers could be developed.

Polyhydroxypolyamides, derived from carbohydrates, have many developing applications: as textiles, in the production of safety glass, as adhesives, as water-based emulsion paints, as fibers and in the formation of durable structural plastics. These polymers are additionally of interest as precursors for polymeric bases, as metal complexing agents, as precursors for polyelectrolytes and as pharmaceutical complexing agents. Furthermore, because of their alternating hydrophobic and hydrophilic monomeric units, these polymers and derivatives thereof possess liquid crystal properties, properties that are important in the formation of high tensile strength fibers.

BRIEF SUMMARY OF THE INVENTION

A new process has now been discovered which permits the formation of polyhydroxypolyamides from cheap carbohydrate starting materials without the requirement of forming a pure diester. In view of this new commercial process it is possible to produce a whole new class of carbohydrate-based polyamides, polyhydroxypolyamides, having important commerical properties not available in the prior art.

In accordance with the present invention a process is provided for the production of a polyamide. In this process an aldose sugar having the structural formula $$\begin{array}{l} CHO \\ | \\ (CHOH)_x \\ | \\ CH_2OH \end{array}$$

where x is an integer of 1 to 6, is reacted with an oxidizing agent to produce the corresponding aldose diacid (aldaric acid). The aldaric acid is reacted with an alkanol in an acid environment to esterify and/or esterify-lactonize the aldaric acid, thus forming the corresponding diester, an aldarate, the corresponding ester(s)-lactone(s), or mixtures thereof. The product of the esterification reaction, which results in the formation of an aldarate, ester(s)-lactone(s) or mixtures thereof, is reacted with a diamine having the structural formula $$H_2NCH_2-(CR^1H)_y-(CR^2H)_z-CH_2NH_2$$

where $R^1$ and $R^2$ are the same or different and are hydrogen, $C_1$–$C_{50}$ alkyl, $C_2$–$C_{50}$ alkenyl or $C_7$–$C_{50}$ aralkyl and y and z are the same or different and are 0 or an integer of 1 to 30 in a polar solvent. The polymeric product of this reaction is a polyhydroxypolyamide having the repeating structural group $$[CO-(CHOH)_x-CO-NHCH_2-(CR^1H)_y-(CR^2H)_z-CH_2NH]_n$$

where $R^1$, $R^2$, x, y and z have the meanings given above and n is an integer of at least 10.

In further accordance with the present invention a polymer having the repeating structural formula $$[CO-(CHOH)_x-CO-NHCH_2-(CR^1H)_y-(CR^2H)_z-CH_2NH]_n$$

where $R^1$, $R^2$, x, y, z and n have the meanings given above with the provisos that if $R^1$ is hydrogen, x and y are 4 and z is 0, the polymer cannot be poly(hexamethylenegalactaramide); and if x is 4 and y and z are 0, the polymer cannot be poly(ethylenegalactaramide).

DETAILED DESCRIPTION

The present invention is directed to a new type of polyamide, a polyhydroxypolyamide, characterized by the repeating structural formula

where $R^1$ and $R^2$ are the same or different and are hydrogen, $C_1$–$C_{50}$ alkyl, $C_2$–$C_{50}$ alkenyl or $C_7$–$C_{50}$ aralkyl; x is an integer of 1 to 6; y and z are the same or different and are 0 or an integer of 1 to about 30; and n is an integer of at least about 10, with the provisos that if $R^1$ is hydrogen; x and y are both 4; and z is 0 then the polymer cannot be poly(hexamethylenegalactaramide); and if x is 4 and y and z are 0, the polymer cannot be poly(ethylenegalactaramide).

Preferably, the polyhydroxypolyamide having the structural formula I is characterized by $R^1$ and $R^2$ being the same or different and being hydrogen or $C_1$–$C_{30}$ alkyl; x being an integer of 2 to 5; y and z being the same or different and being 0 or an integer of 1 to 20; and n being an integer of about 10 to about 200 with the provisos that when $R^1$ is hydrogen; x and y are 4; and z is 0, the polymer is not poly(hexamethylenegalactaramide); and when x is 4 and y and z are 0, the polymer cannot be poly(ethylenegalactaramide).

More preferably, the polyhydroxypolyamide has the structural formula I where $R^1$ and $R^2$ are the same or different and are hydrogen or $C_1$–$C_{10}$ alkyl; x is an integer of 3 or 4; y and z are the same or different and are 0 or an integer of 1 to 10; and n is an integer of between about 10 and about 100, with the provisos that when $R^1$ is hydrogen; x and y are 4; and z is 0, the polyhydroxypolyamide is not poly(hexamethylenegataclaramide), when x is 4 and 7 and z are 0 the polymer cannot be poly(ethylenegluctaramide).

Still more preferably, the polyhydroxypolyamide is selected from the group consisting of poly(hexamethyleneglucamide), poly(hexamethylenexylaramide), poly(2-methylpentamethylenegalactaramide), poly(2-methyl-pentamethyleneglucaramide), poly(2-methylpentamethylene-xylaramide, poly(octamethylenegalactaramide), poly(octamethyleneglucaramide), poly(octamethylenexylaramide), poly(dodecamethylenegalactaramide), poly(dodecamethyleneglucaramide and poly(dodecamethylenexylaramide).

In another preferred embodiment of the polyhydroxypolyamide of the present invention the polymer is poly(hexa-, octa-, 2-methylpenta- or dodecamethyleneglucaramide).

In still another preferred embodiment of this invention the polyhydroxypolyamide is poly(octa-, 2-methylpenta- or dodecamethylenegalactaramide).

In yet another preferred embodiment of the subject invention, the polyhydroxypolyamide is poly(hexa-, octa-, 2-methylpenta- or dodecamethylenexylaramide).

The polymers, poly(hexamethyleneglucaramide) and poly(hexamethylenexylaramide) are particularly preferred embodiments of the polyhydroxypolyamide of this invention.

The polyhydroxypolyamide having the repeating structural unit I has many developing applications. Among these are: as fibers for textiles, in the production of safety glass, for use as adhesives or water-based emulsion paints, for moldable or extrudable fabricated products and films, as metal complexing agents, as pharmaceutical complexing agents, as precursors for polyelectrolytes and polymeric bases, as high tensile strength fibers based upon the polymer's liquid crystal character, as blends with other fiber-forming polymers to form polymeric compositions that can be spun into fibers and as polymers for materials requiring biodegradation properties which take advantage of the carbohydrate character of such materials.

In another aspect of the present invention a process is provided for producing the polyamide of the present invention. In this process an aldose sugar having the structural formula

where x is an integer of 1 to 6, preferably, an integer of 2 to 5 and more preferably, an integer of 3 or 4 is reacted with an oxidizing agent to produce the corresponding aldose diacid. In a preferred embodiment the oxidizing agent is nitric acid. The aldose diacid produced in accordance with this reaction has the structural formula

where x has the meanings given above.

Those skilled in the art are aware that all aldose acids cannot readily be obtained in the pure form of the diacid depicted in structural formula III. Aldose acids containing five or more carbon atoms may exist in the diacid form, in the acid-lactone form, as illustrated by structural formula IIIa, and in the dilactone form, as depicted by structural formula IIIB.

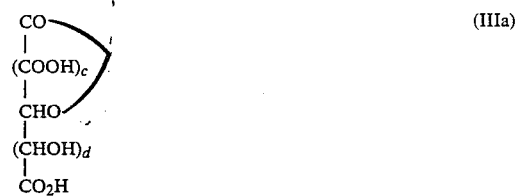

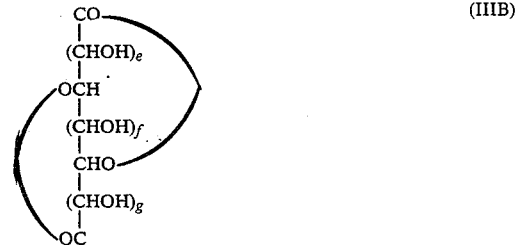

where for c and d are independently zero or an integer limited by requirement that the sum of c, d and 1 is equal to the value of x as defined in structural formula III; and e, f and g are independently zero or an integer limited by the requirement that the sum of e, f, g and 2 is equal to the value of x, defined in structural formula III.

Notable among aldose acids which exist in multiple forms is glucaric acid (from glucose) which is typically generated as a mixture of the pure diacid form, a multiple acid-lactone and a dilactone. The process of the present application for making polyhydroxpolyamides, unlike the prior art, has commercial utility since the process can utilize any form of aldose acids or any mixture thereof. That is, the process can utilize the pure diacid, acid-lactones, dilactones and mixtures thereof.

It is emphasized that because of the availability of many aldose diacids, acid-lactones and dilactones, defined by structural formula III, IIIa and IIIb, respectively, the process of the present invention may, in a preferred embodiment, start with one of those compounds rather than the aldose sugar.

The diacid, acid-lactone or dilactone, having structural formulas III, IIIa or IIIb, or any combination thereof, is reacted with an alkanol having the structural formula IV,

ROH     (IV)

where R is $C_1$–$C_6$ alkyl. Preferably, R is $C_1$–$C_4$ alkyl, more preferably, methanol or ethanol and most preferably, methanol. The compound having the formula III, IIIa and/or IIIb and the alkanol are reacted in an acid environment. In a preferred embodiment the acid is provided by HCl. Thus, in a preferred embodiment, the esterification reaction occurs in methanolic HCl or ethanolic HCl. It is particularly preferred that the esterification reaction occurs in methanolic HCl.

The esterification product of this reaction is an aldarate, a diester having the structural formula,

where R and x have the meanings given above; one or more ester-lactones, difunctional compounds having ester and lactone functionality, having the structural formula

where R and x have the meanings given above; and a and b are independently 0 or integers restricted by the requirement that the sum a, b and 1 has a value equal to that of x defined in structural formula V or a mixture of an aldarate having the structural formula V and an ester-lactone(s) having the structural formula VI.

Independent of whether the esterification product is an ester-lactone, an aldarate or a mixture thereof, it is in turn, polymerized with a diamine having the structural formula

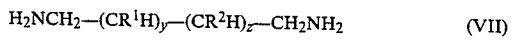

where $R^1$, $R^2$, y and z have the same broad, preferred and more preferred meanings given for these variables in the discussion of the polyhydroxypolyamide. Preferably, the a primary diamine having the structural formula VII is selected from the group consisting of hexamethylenediamine, octamethylenediamine, 2-methylpentamethylenediamine or 1,12-diaminodecane.

It is emphasized that the actual product of the esterification reaction is not critical in that the esterification product, without any separation of components, is reacted with the diamine having the structural formula VI in the polymerization reaction.

The polymerization reaction between the esterification reaction product and the diamine occurs in the presence of a polar solvent and preferably in the presence of a tertiary amine. The preferred tertiary amine is a trialkylamine, usually triethylamine. Among the preferred polar solvents utilized in the polymerization reaction are $C_1$–$C_6$ alkanols, that is, a compound having the formula R'OH where R' is $C_1$–$C_6$ alkyl, dioxane, tetrahydrofuran, dimethylformamide, acetonitride, ethylene glycol, dimethylacetamide, methyl sulfoxide and mixtures thereof. Of these, the alkanols, especially methanol and ethanol, more especially methanol, is particularly preferred.

It is emphasized that the presence of a tertiary amine, preferably triethylamine, is not an essential component in the polymerization reaction. The polymerization reaction occurs in the absence of this component. However, the tertiary amine is believed to provide an important function which suggests, to those skilled in the art, the advisability of incorporating such a compound in the polymerization reaction. Although the invention is independent of any theory defining its mechanism, the tertiary amine is thought to aid in solubilizing the esterification reaction mixture. Thus, in the absence of the tertiary amine the reaction is heterogeneous. If the reaction occurs under heterogeneous conditions, there is no way of determining when polymerization begins. The preferred condensation polymerization procedure described above involves refluxing the alcoholic solvent, usually methanol or ethanol, with the onset of polymerization noticed by precipitation. In the absence of the tertiary amine, a two-phase system is present from the start thus masking the onset of polymerization.

The precipitate product of this polymerization step is the polyhydroxypolyamide having the structural formula I as defined therein.

The following examples are given to illustrate the present invention. Because these examples are given for illustrative purposes only, the invention should not be limited thereto.

EXAMPLE 1

Preparation of Poly(hexamethyleneglucaramide) (Polymer No. 1)

Glucaric acid was formed by oxidation of glucose with nitric acid according to a standard procedure, e.g. C. L. Mehltretter, in "Methods in Carbohydrate Chemistry", R. L. Whistler and M. L. Wolfrom, Eds; Vol. II, Academic Press, New York, 1963, pp 46–48. The glucaric acid thus generated was isolated as its calcium salt, calcium glucarate. Calcium glucarate (30 g, 100 mmol) was converted to glucaric acid (e.g., acid form cation exchange resin: Amberlite IR-120) in water, the water removed at reduced pressure to yield the noncrystalline glucaric acid as a mixture of diacid, acidlactone and dilactone forms. This material was dissolved in methanolic HCl (250 mL, 1 molar). The solution was refluxed for 16 hours and the solvent was then removed at reduced pressure. Fresh methanolic HCl (100 ml, 1 molar) was added to the residue. The resulting solution was stirred at room temperature for 16 hours. Benzene was added and the solvents removed at reduced pressure to yield an ester reaction product as a syrup.

The constituents of this syrupy esterification product mixture, obtained in a yield of 18.8 g., included the glucarate diester, evidenced by an ester carbonyl IR peak at 1735 cm$^{-1}$, as well as the ester-lactone, evidenced by a lactone carbonyl IR peak at 1775 cm$^{-1}$.

The esterification product (4.7 g., 22.8 mmol) was dissolved in 50 ml of methanol and 1 ml triethylamine. To this was added 50 ml of methanol containing 25.5 mmol of dissolved hexamethylenediamine. This reaction mixture was refluxed for 2 hours then cooled to room temperature. A white solid polymer was isolated by vacuum filtration. The polymer, after washing with methanol, was obtained in a yield of 5.5 g. The polymer was characterized by a melting point of 190° to 205° C. and had an amide carbonyl amide I band at 1635 cm$^{-1}$ and an amide carbonyl Amide II band at 1530 cm$^{-1}$.

A summary of this example, including an elemental analysis of the polymer product, is included in Table I.

EXAMPLE 2

Preparation of Poly(hexamethylenexylaramide) (Polymer No. 2)

Xylaric acid, mp 142° to 145° C., (18 g, 0.1 mol), obtained by oxidation of xylose with nitric acid, [see C. E. Cantrell, D. E. Kiely, G. J. Abrusrato and P. M. Riovdan, *J. Org. Chem.*, 42, 3562 (1977)] or as a starting material, was added to methanolic HCl (150 ml, 1 molar) and the reaction mixture refluxed for 16 hours. Upon completion of refluxing the solvent was removed at reduced pressure and a syrupy product obtained. The syrupy product was dissolved in methanolic HCl (50 ml, 1 molar) and stirred at room temperature for 16 hours. Benzene was added to the reaction mixture and the solvents were thereafter removed at reduced pressure to yield an esterified product obtained in quantitative yield as a syrup. The product was characterized from ester carbonyl IR peaks at 1745 cm$^{-1}$, characteristic of the glucarate ester function, and from a lactone carbonyl at 1795 cm$^{-1}$, characteristic of the ester-lactone.

Hexamethylenediamine (24 mmol) dissolved in methanol (60 ml) was added to the esterification product (4.6 g, 22 mmol). To this was added 1 ml of triethylamine in methanol (14.5 ml). The reaction mixture was refluxed for 1 to 2 hours during which time the polymer precipitated. The reaction mixture was cooled to room temperature and the solid white polymer isolated by vacuum filtration. The product, after washing with methanol, was obtained in a yield of 5.2 g. The polymeric product was characterized by a melting point of 198°-202° C. and an amide carbonyl IR peak at 1545 cm$^{-1}$ (Amide II Band) and an amide carbonyl IR peak at 1640 cm$^{-1}$.

The results of the example, including an elemental analysis and melting point determination of the polymer product, is included in Table 1.

EXAMPLE 3

Preparation of Polymer Nos. 3-11

Polymers Nos. 3 to 11 were prepared in accordance with the procedure set forth in Examples 1 and 2. A summary of these examples is included in Table I along with Polymer Nos. 1 and 2 made in accordance with Examples 1 and 2, respectively. This table includes a characterization of each of the polymers by melting point and elemental analysis.

It is emphasized that all the polyhydroxypolyamides included in Table I but for Polymer No. 4 were obtained as white solids. Polymer No. 4 was formed as a colorless glass. Furthermore, all the polymers in Table I demonstrated a characteristic amide carbonyl Amide I Band in the IR spectrum (ca. 1625-1680 cm$^{-1}$) and characteristic amide carbonyl Amide II Band in the IR spectrum (ca. 1525-1540 cm$^{-1}$). However, no ester or lactone C=O stretching frequencies were found in the analysis of any of Polymers 1 to 11.

TABLE I

| Polymer No. | Name | Repeating Structural Unit | Elemental Analysis | | | Melt Pt, °C. |
|---|---|---|---|---|---|---|
| 1 | Poly(hexamethyleneglucaramide) | $[C_{12}H_{22}N_2O_6]_n$ | Calcd: C, 49.65; | H, 7.64; | N, 9.65 | 190-205 |
| | | | Found: C, 49.16; | H, 7.91; | N, 9.96 | |
| 2 | Poly(hexamethylenexylaramide) | $[C_{11}H_{20}N_2O_5]_n$ | Calcd: C, 50.76; | H, 7.74; | N, 10.76 | 198-202 |
| | | | Found: C, 50.52; | H, 7.81; | N, 10.66 | |
| 3 | Poly(2-methylpentamethylene-galactaramide) | $[C_{12}H_{22}N_2O_6]_n$ | Calcd: C, 49.65; | H, 7.64; | N, 9.65 | 204-210 |
| | | | Found: C, 49.57; | H, 8.00; | N, 10.03 | |
| 4 | Poly(2-methylpentamethylene-glucaramide) | $[C_{12}H_{22}N_2O_6]$ | Calcd: C, 49.65; | H, 7.64; | N, 9.65 | Colorless glass |
| | | | Found: C, 49.68; | H, 8.06; | N, 10.40 | |
| 5 | Poly(2-methylpentamethylene-xylaramide) | $[C_{11}H_{20}N_2O_5]_n$ | Calcd: C, 50.76; | H, 7.74; | N, 10.76 | 163-210 |
| | | | Found: C, 50.55; | H, 7.81; | N, 10.57 | |
| 6 | Poly(octamethylenegalactaramide) | Isolated as an oligomer with an average degree of polymerization of 9 having the elemental constituency: $C_{64}H_{124}N_{10}O_{24}$ | Calcd: C, 54.22; | H, 8.82; | N, 9.88 | 240 (decomp) |
| | | | Found: C, 54.19; | H, 8.91; | N, 10.00 | |
| 7 | Poly(octamethylenexylaramide) | $[C_{13}H_{24}N_2O_5]_n$ | Calcd: C, 54.15; | H, 8.39; | N, 9.72 | 203-207 (decomp) |
| | | | Found: C, 53.70; | H, 8.46; | N, 9.84 | |
| 8 | Poly(octamethyleneglucaramide) | $[C_{14}H_{26}N_2O_6]_n$ | Calcd: C, 52.02; | H, 8.23; | N, 8.80 | 195-200 (decomp) |
| | | | Found: C, 52.70; | H, 8.25; | N, 8.81 | |
| 9 | Poly(dodecamethylenegalacataramide) | Isolated as a pentamer with terminal amine functions having the elemental constituency $C_{48}H_{96}N_6O_{12}$ | Calcd: C, 60.73; | H, 10.19; | N, 8.85 | 240 (decomp) |
| | | | Found: C, 60.90; | H, 10.31; | N, 8.96 | |
| 10 | Poly(dodecamethylenexylaramide) | $[C_{17}H_{32}N_2O_5]_n$ | Calcd: C, 59.28; | H, 9.36; | N, 8.13 | 208-220 (decomp) |
| | | | Found: C, 58.06; | H, 9.23; | N, 7.90 | |
| 11 | Poly(dodecamethyleneglucaramide) | $[C_{18}H_{34}N_2O_6]_n$ | Calcd: C, 57.75; | H, 9.15; | N, 7.48 | 205 |

| Polymer | | Repeating | | Melt Pt, |
| No. | Name | Structural Unit | Elemental Analysis | °C. |
| --- | --- | --- | --- | --- |
| | | | Found: C, 57.82; H, 9.16; N, 7.46 | (decomp) |

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A polyhydroxypolyamide having the structural formula

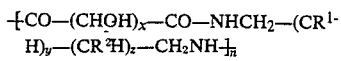

where $R^1$ and $R^2$ are the same or different and are hydrogen, $C_1$-$C_{50}$ alkyl, $C_2$-$C_{50}$ alkenyl or $C_7$-$C_{50}$ aralkyl; x is an integer of 1 to 6; y and z are the same or different and are 0 or an integer of 1 to about 30; and n is an integer of at least about 10 with the provisos that if $R^1$ is hydrogen; x and y are both 4; and z is 0 then the polymer cannot be poly(hexamethylenegalactaramide) and if x is 4; and y and z are 0, then the polyamide cannot be poly(ethylenegalactaramide).

2. A polymer in accordance with claim 1 wherein $R^1$ and $R^2$ are the same or different and are hydrogen or $C_1$-$C_{30}$ alkyl; x is an integer of 2 to 5; y and z are the same or different and are 0 or an integer of 1 to 20; and n is an integer of about 10 to about 200.

3. A polymer in accordance with claim 2 wherein $R^1$ and $R^2$ are the same or different and are hydrogen or $C_1$-$C_{10}$ alkyl; x is an integer of 3 or 4; y and z are the same or different and are 0 or an integer of 1 to 10; and n is an integer of about 10 to about 100.

4. A polymer in accordance with claim 1 selected from the group consisting of poly(hexamethyleneglucaramide), poly(hexamethylenexylaramide), poly(2-methylpentamethylenegalactaramide), poly(2-methylpentamethyleneglucaramide), poly(2-methylpentamethylenexylaramide), poly(octamethylenegalactaramide), poly(octamethylenexylaramide), poly(octamethyleneglucaramide), poly(dodecamethylenegalactaramide), poly(dodecamethylenexylaramide), poly(dodecamethyleneglucaramide).

5. A polymer in accordance with claim 4 selected from the group consisting of poly(hexamethylenexylaramide), poly(2-methylpentamethylenexylaramide), poly(octamethylenexylaramide), poly(dodecamethylenexylaramide) and poly(dodecamethyleneglucaramide).

6. A polymer in accordance with claim 4 selected from the group consisting of poly(hexamethyleneglucaramide), poly(2-methylpentamethyleneglucaramide), poly(octamethyleneglucaramide) and poly(dodecamethyleneglucaramide).

7. A polymer in accordance with claim 4 selected from the group consisting of poly(2-methylpentamethylenegalactaramide, poly(octamethylenegalactaramide) and poly(dodecamethylenegalactamide).

8. A polymer in accordance with claim 5 consisting of poly(hexamethylenexylaramide):

9. A polymer in accordance with claim 6 which is poly(hexamethyleneglucaramide).

10. A process for making a polyhydroxypolyamide comprising:

(a) reacting an aldose sugar having the structural formula

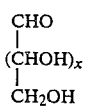

where x is an integer of 1 to 6 with an oxidizing agent to form a product selected from the group consisting of an aldaric acid having the structural formula

where x has the meaning given above, an acid-lactone having the structural formula

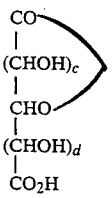

where c and d are independently 0 or an integer restricted by the requirement that the sum of c, d and 1 is equal to the value of x, a dilactone having the structural formula

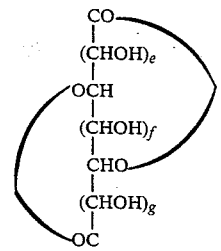

where e, f and g are independently zero or an integer restricted by the requirement that the sum of e, f, g and 2 is equal to the value of x and mixtures thereof;

(b) esterifying said product of step (a) with an alkanol having the structural formula

ROH where R is $C_1$-$C_6$ alkyl, in an acid environment wherein an esterification product is obtained; and (c) polymerizing said esterification product with a diamine having the structural formula $$H_2NCH_2-(CR^1H)_y-(CR^2H)_z-CH_2NH_2$$

where $R^1$ and $R^2$ are the same or different and are hydrogen, $C_1$–$C_{50}$ alkyl, $C_2$–$C_{50}$ alkenyl or $C_7$–$C_{50}$ aralkyl; and y and z are the same or different and are 0 or an integer of 1 to about 30, in a polar solvent whereby a polyhydroxypolyamide having the repeating structural unit $$[CO-(CHOH)_x-CO-NHCH_2-(CR^1H)_y-(CR^2H)_z-CH_2NH]_n$$

where x, y, z, $R^1$ and $R^2$ have the meanings given above and n is an integer of at least about 10 is formed.

11. A process in accordance with claim 10 wherein said polar solvent of said polymerization step is selected from the group consisting of an alkanol having the structural formula R′OH, where R′ is an alkyl of 1 to 6 carbon atoms, dioxane, tetrahydrofuran, dimethylformamide, acetonitrile, ethylene glycol, dimethylacetamide, methyl sulfoxide and mixtures thereof.

12. A process in accordance with claim 11 wherein said polar solvent of said polymerization step is an alkanol having the structural formula R′OH where R′ is an alkyl of 1 to 6 carbon atoms.

13. A process in accordance with claim 12 wherein said alkanol is methanol.

14. A process in accordance with claim 10 wherein said polymerization step occurs in the presence of a tertiary amine.

15. A process in accordance with claim 14 wherein said tertiary amine is triethylamine.

16. A process in accordance with claim 15 wherein said acid environment of said esterification step is provided by an agent selected from the group consisting of methanolic HCl and ethanolic HCl.

17. A process in accordance with claim 16 wherein said acid environment is provided by methanolic HCl.

18. A process in accordance with claim 10 wherein said aldose sugar is selected from the group consisting of glucose, xylose, galactose and ribose.

19. A process for making a polyhydroxypolyamide comprising:
(a) reacting an aldaric compound selected from the group consisting of a diacid having the stuructural formula $$\begin{array}{c} COOH \\ | \\ (CHOH)_x \\ | \\ COOH \end{array}$$

where x is an integer of 1 to 6, an acid-lactone having the structural formula

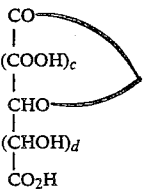

where c and d are independently zero or an integer restructed by the requirement that the sum of c, d and 1 equals the value of x, a dilactone having the structural formula

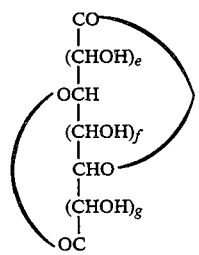

where e, f and g are independently zero or an integer restricted by the requirement that the sum of e, f, g and 2 equals the value of x and mixtures thereof with an alkanol having 1 to 6 carbon atoms in an acid environment to form an esterification product; and (b) reacting said esterification product with a primary diamine in a basified polar solvent to form a polyhydroxypolyamide.

20. A process in accordance with claim 19 wherein said diacid is selected from the group consisting of glucaric acid, galactaric acid and xylaric acid and said alcohol is methanol.

21. A process in accordance with claim 20 wherein said step (a) occurs in the presence of HCl.

22. A process in accordance with claim 19 wherein said alkanol of step (a) is selected from the group consisting of methanol and ethanol.

23. A process in accordance with claim 20 wherein said primary amine is selected from the group consisting of hexamethylenediamine, octamethylenediamine, 2-methylpentamethylenediamine and 1,12-diaminedecane.

24. A process in accordance with claim 23 wherein said step (b), said reaction between said primary amine and said esterification product, occurs in the presence of a tertiary amine.

25. A process in accordance with claim 24 wherein said tertiary amine is triethylamine.

26. A process in accordance with claim 19 wherein said polar solvent of step (b) is methanol.

* * * * *

UNITED STATES PATENT AND TRADEMARK OFFICE
CERTIFICATE OF CORRECTION

PATENT NO. : 4,833,230

DATED : May 23, 1989

INVENTOR(S) : Donald E. Kiely, et al.

It is certified that error appears in the above-identified patent and that said Letters Patent is hereby corrected as shown below:

Column 12, line 6, Claim 19: "$(COOH)_c$" should read as --$(CHOH)_c$--

Signed and Sealed this

Twenty-fourth Day of July, 1990

Attest:

HARRY F. MANBECK, JR.

*Attesting Officer*　　　*Commissioner of Patents and Trademarks*